US009826727B2

(12) United States Patent
Balcarek et al.

(10) Patent No.: US 9,826,727 B2
(45) Date of Patent: Nov. 28, 2017

(54) METHODS, DEVICES AND SYSTEMS FOR THERMAL-BASED PEST CONTROL

(71) Applicants: John Balcarek, Huntsville, AL (US); Vojtech Svoboda, Atlanta, GA (US)

(72) Inventors: John Balcarek, Huntsville, AL (US); Vojtech Svoboda, Atlanta, GA (US)

(*) Notice: Subject to any disclaimer, the term of this patent is extended or adjusted under 35 U.S.C. 154(b) by 235 days.

(21) Appl. No.: 13/953,370

(22) Filed: Jul. 29, 2013

(65) Prior Publication Data

US 2014/0026469 A1 Jan. 30, 2014

Related U.S. Application Data

(60) Provisional application No. 61/785,422, filed on Mar. 14, 2013, provisional application No. 61/676,685, filed on Jul. 27, 2012.

(51) Int. Cl.
*A01M 1/20* (2006.01)

(52) U.S. Cl.
CPC .................. *A01M 1/2094* (2013.01)

(58) Field of Classification Search
CPC ...... A01M 1/103; A01M 1/20; A01M 1/2011; A01M 1/2022; A01M 1/2038; A01M 1/2055; A01M 2200/011; A01M 9/0007; A01M 13/003; A01M 13/00; A01M 1/2044
USPC ......... 43/107, 108, 121, 123, 124, 125, 127, 43/131
See application file for complete search history.

(56) References Cited

U.S. PATENT DOCUMENTS

| 4,171,340 A * | 10/1979 | Nishimura | A01M 1/2061 |
| | | | 422/1 |
| 4,228,124 A * | 10/1980 | Kashihara | A01M 1/2072 |
| | | | 392/386 |
| 6,436,128 B1 * | 8/2002 | Usui | A61F 7/03 |
| | | | 126/263.02 |
| 6,588,140 B1 * | 7/2003 | Johnson | A01M 1/2094 |
| | | | 43/124 |
| 7,537,002 B2 * | 5/2009 | Handa | A47J 36/28 |
| | | | 126/263.01 |
| 2004/0000660 A1 * | 1/2004 | Li | A01M 1/04 |
| | | | 252/183.11 |

(Continued)

FOREIGN PATENT DOCUMENTS

| EP | 1935437 | 6/2008 |
| JP | 2003-171658 | 6/2003 |

(Continued)

OTHER PUBLICATIONS

EP 1935437.*

(Continued)

*Primary Examiner* — Thien Thanh Pham
(74) *Attorney, Agent, or Firm* — Morris, Manning & Martin, LLP

(57) ABSTRACT

Disclosed herein are devices and methods for the chemical-based thermal control of pests, particularly bed bugs. Disclosed herein are devices capable of heat generation for thermal-based pest control within an enclosed body, typically an item of luggage. Disclosed herein are components for minimizing heat loss associated with thermal-based pest control. Disclosed herein are methods of chemical-based heat generation for thermal-based pest control.

14 Claims, 5 Drawing Sheets

Left: A pouch of the flexible casing material made of multilayer aluminum core material. Two sides were thermally sealed by lamination, right hand side bended, top side opened for loading the fabric pouch with CaO powder. Right: Fabric (cotton cloth) pouch for loading and immobilization CaO powder and enhanced water transport. Two sides sewn, one bended, bottom opened for loading the powder.

CaO powder was loaded in fabric cloth and the opened side was stapled. The pouch was then inserted into the aluminum core pouch material.

(56) References Cited

U.S. PATENT DOCUMENTS

| | | | | |
|---|---|---|---|---|
| 2004/0128902 A1* | 7/2004 | Kollars, Jr. | ............ | A01M 1/023 43/107 |
| 2005/0089502 A1* | 4/2005 | Schansberg | ......... | A01M 1/2061 424/76.1 |
| 2006/0154006 A1* | 7/2006 | Usui et al. | .................... | 428/34.1 |
| 2008/0245889 A1* | 10/2008 | Klabbers | ............. | A01M 1/2044 239/55 |
| 2009/0260277 A1* | 10/2009 | Lebost | .................... | A01M 1/14 43/114 |

FOREIGN PATENT DOCUMENTS

| | | |
|---|---|---|
| WO | WO 02/05640 | 1/2002 |
| WO | WO 02/068005 | 9/2002 |
| WO | WO 2014/018970 | 1/2014 |

OTHER PUBLICATIONS

International Search Report and the Written Opinion of the International Search Authority for Application No. PCT/US2013/052533 (dated Nov. 13, 2013).

International Search Report and the Written Opinion of the International Search Authority dated Nov. 13, 2013 for Application No. PCT/US2013/052533, which was filed on Jul. 29, 2013 and published as WO 2014/018970 (Applicant—John C. Balcarek) (10 pages).

International Preliminary Report on Patentability dated Jan. 27, 2015 for Application No. PCT/US2013/052533, which was filed on Jul. 29, 2013 and published as WO 2014/018970 (Applicant—John C. Balcarek) (7 pages).

* cited by examiner

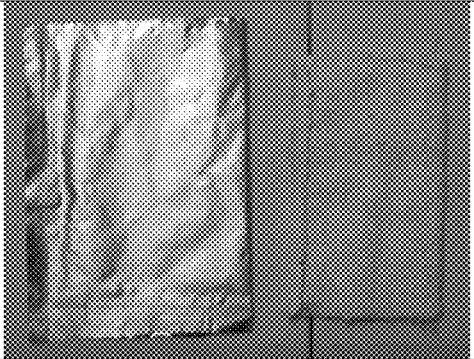

Fig. 3 A: Left: A pouch of the flexible casing material made of multilayer aluminum core material. Two sides were thermally sealed by lamination, right hand side bended, top side opened for loading the fabric pouch with CaO powder. Right: Fabric (cotton cloth) pouch for loading and immobilization CaO powder and enhanced water transport. Two sides sewn, one bended, bottom opened for loading the powder.

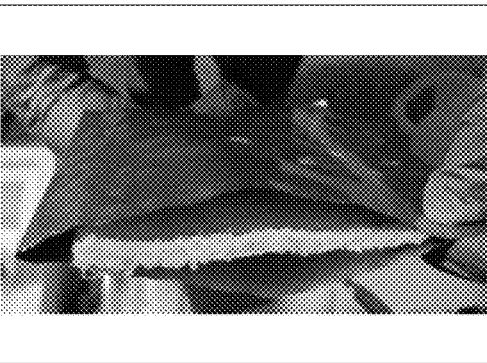

Figure 3B: CaO powder was loaded in fabric cloth and the opened side was stapled. The pouch was then inserted into the aluminum core pouch material.

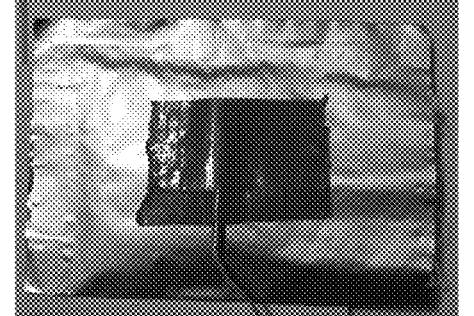

Figure 3C: Placement of J-type thermal couple on the external wall of the pouch.

Figure 3D: Cotton cloth wrapped around the pouch to reduce air flow, pouch cooling, and heat losses to air. Water was filled into the pouch in the shown position.

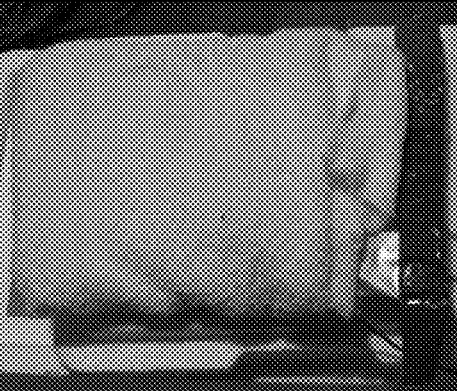

Figure 3E: The open side of the pouch was sealed with adhesive plastic tape and the pouch was operated in horizontal position. The pouch is covered by the external component, a towel.

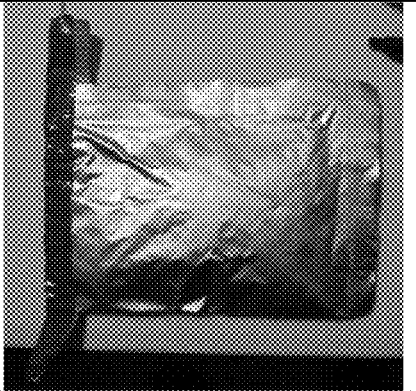

Figure 3F: After the experiment, the pouch was evaluated. No rupture, penetration, leakage, or damage of the pouch was observed.

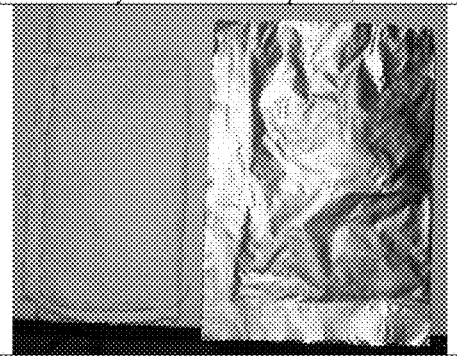

Figure 3G After the experiment the pouch was opened and found no damage to the textile (heating element) or to the cover aluminum core material.

METHODS, DEVICES AND SYSTEMS FOR THERMAL-BASED PEST CONTROL

RELATED APPLICATIONS

The present invention claims the priority and the benefit of the filing dates of U.S. Provisional Patent Application Ser. Nos. 61/676,685, filed Jul. 27, 2012, and 61/785,422 filed Mar. 14, 2013, each of which is herein incorporated in its entirety.

FIELD OF THE INVENTION

The invention relates generally to the thermal-based destruction of pests, particularly in pests in closed containers such as luggage. Specifically, the invention relates to devices capable of heat generation for thermal-based pest control, methods for controlling pests in containers with thermal-based pest control, and systems and kits comprising devices and other components for minimizing heat loss associated with thermal-based pest control.

BACKGROUND OF THE INVENTION

Before the 1940s, bed bugs were widespread in homes, hotels, and boarding houses. Bed bugs were nearly eradicated by the widespread use of insecticides, such as DDT, during the mid- to late-twentieth century. In the past few years, however, bed bugs have been making a resurgence due to a decrease in the use of pesticides, an increase in international travel, and the fact that bed bugs are developing a resistance to pesticides. This resurgence prompted the U.S. Environmental Protection Agency to hold a National Bed Bug Summit in both 2009 and 2011.

Bed bugs commonly reside in seams of mattresses, edges of carpeting, bed frames, behind baseboards, window and door casings, picture frames, loosened wallpaper, upholstered furniture, cracks and crevices in the furniture, in walls or floors found inside homes or hotels, and are being transmitted by travelers to airplanes, taxis, luggage storage sites, and any place where containers having bed bugs rest or are stored. Bed bugs can enter a structure by attaching either themselves or their eggs to clothing, bedding, mattresses, and used furniture. Bed bugs may also, for example, enter homes by hiding in luggage that was present in a hotel infested with bed bugs, luggage that was stored in an overhead or underseat compartment or in the luggage area of an airplane, bus or train, luggage that temporarily stored by travelers or at a hotel bellhop station, in taxis or other forms of transport, or from any site having bed bugs to a container placed within that site.

There are several known ways for eradicating bed bugs, including the use of chemicals, natural products, pesticides, and sticky pad trays. Alternatively, companies may provide a thermal system that increases the heat within an entire structure, or in particular rooms, in an effort to reach a temperature that kills any bed bugs (e.g., ThermaPure structural pasteurization). Spot treatment of items, such as luggage, may require a device that is powered by electricity (e.g., ThermalStrike Expedition; U.S. Patent Application Publication No. 2011-0113674). None of these currently-used bed bug control devices or chemicals, however, provide for a non-electricity using, disposable way to prevent the inadvertent transport of bed bugs hiding in a container such as luggage, into a non-infested site, such as one's home. This is a particular problem for travelers whose luggage may become infested with bed bugs while the luggage is present in a hotel room containing bed bugs.

Devices and methods for killing bed bugs, especially those found within luggage, are needed so that bed bugs are not brought into the home via the infested luggage.

SUMMARY OF THE INVENTION

The present invention comprises methods, devices, systems and kits for the destruction of pests, particularly bed bugs. The invention features methods, devices, systems and kits for the chemical-based heat generation for thermal killing of these pests within a container, such as an item of luggage. A container may be any size, and the number of devices may be increased to provide sufficient heat to kill the bed bugs or eggs within the container. For ease of description, a container may be referred to herein as luggage, meaning suitcases, bags, backpacks, and other items for carrying personal belongings during a journey, and includes baggage, bags, cases and gear. Containers may be boxes or cases that contain solid articles, such as pillows, clothing, bedding, curtains, towels or other materials that may harbor pests, such as bed bugs.

Disclosed herein are devices for the thermal-based destruction of pests, particularly in containers, comprising a casing and at least a heating element, for example, a spiral wound element. A heating element contains as a part of the heating element a chemical compound that can undergo an exothermic reaction when contacted by a fluid (e.g., water) such as calcium oxide. The heating element may be made from any material that can withstand the temperatures produced in the chemical reaction, and such a material may have pores for water transport. Examples of materials include, but are not limited to, textiles, which may be woven or nonwoven, cotton, plastics, plastic or natural strings, porous or perforated metal sheet, plastic sheet, porous ceramic materials, foamed materials, or porous fiberglass materials. In some embodiments, a heating element is coated or enclosed in a water soluble membrane for delayed or slow start of the heat generation chemical reaction. A casing comprises at least one resealable inlet, whereby said inlet permits the infusion of a fluid such as water. The casing may comprise at least one gas outlet. In an embodiment, the casing is made from metal, plastic, or rubber.

Disclosed herein are components for use with a thermal-based pest control device that minimizes heat loss associated with thermal-based pest control. Specifically, disclosed herein are components comprising reusable or disposable thermal insulation covers, capable of minimizing heat loss to the ambient environment, for example components comprising an envelope made of a non-heat transferring material that can enclose a container into which a thermal-based pest control device of the present invention has been placed.

Disclosed herein are methods for treating containers to kill or reduce the number of living organisms (pests) within the container using chemical-based heat generation for thermal-based pest control. In general, a method may comprise adding water to a disposable heat generating thermal-based pest control device of the present invention, as disclosed herein, and placing said device within an enclosed body, such as a container or an item of luggage for a time sufficient to kill or reduce the number of living pests located within the container. The addition of water to the device induces an exothermic reaction with the chemical compound of the heating element, such as calcium oxide. Once the thermal-based pest control device is activated and the exothermic chemical reaction has begun, the container is closed and the thermal-based pest control device of the present invention raises the temperature within the enclosed container and the bed bugs, their eggs, and larvae are killed or the number of living ones of these are reduced. The method may further comprise using a component that covers the enclosed body and provides thermal insulation to minimize heat loss from the container.

BRIEF DESCRIPTION OF THE FIGURES

The accompanying figures, which are incorporated in and constitute a part of this specification, illustrate several aspects and together with the description serve to explain the principles of the invention.

FIG. 3 A-G shows an exemplary embodiment of a device of the present invention and its use.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention comprises methods, devices, systems and kits for controlling bed bug infestation of luggage or other similar containers, enclosed boxes, or closable items. The killing of all bedbugs present or reducing the number of living bed bugs in the container prevents the transport and/or entry of bed bugs into a dwelling or other enclosed area where bed bugs are not found. An aspect of the present invention comprises a disposable device that generates heat, by means of an exothermic chemical reaction, which elevates the temperature within a given container, such as a suitcase or other luggage, for a sufficient period of time to provide pest control in the container or luggage. The heat generated by a disposable device of the present invention is particularly effective against bed bugs, their eggs, and nymphs and other lifecycle forms. As referred to herein unless specifically noted otherwise, the term "bed bugs" or "pests" includes the adult, egg, larvae and all lifecycle stages of the insect. A bed bug pest or similar types of pests, include but are not limited to, parasitic insects of the cimicid family that feed on blood, members of the genus *Cimex, Cimex lectularius*, the common bed bug, or other pests, bat bugs, *C. pipistrelli, C. pilosellus*, and *C. adjunctus*.

Figure 1:
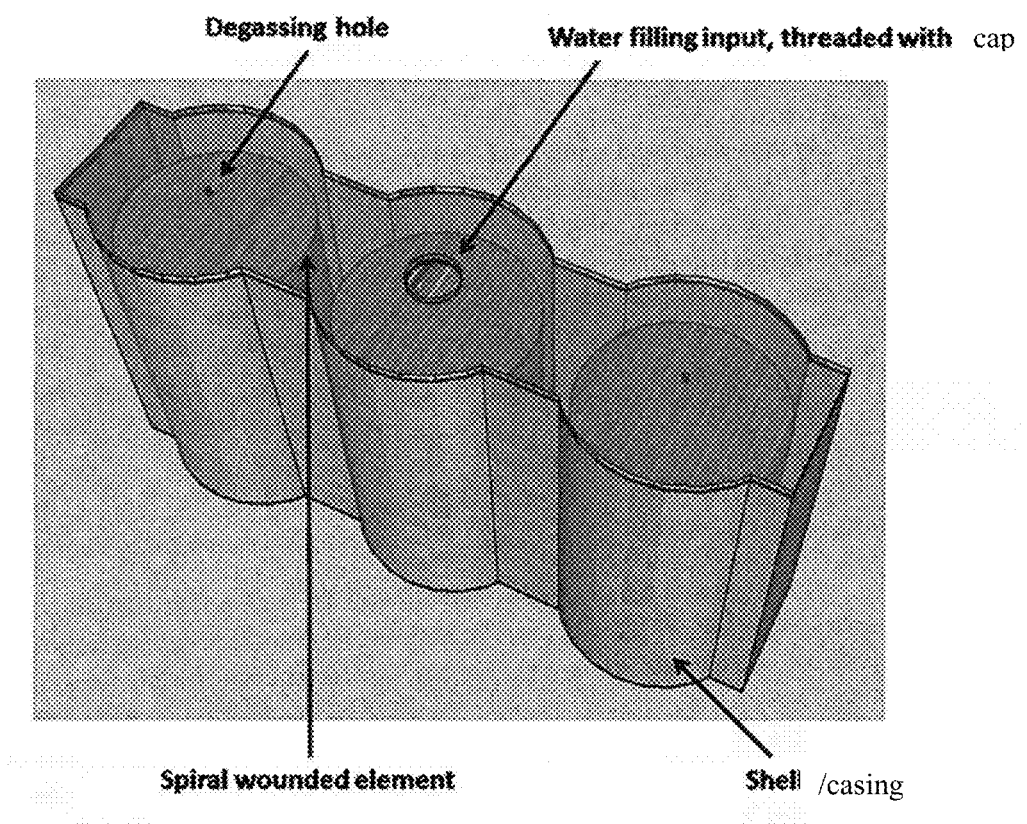
FIG. 1 discloses a three dimensional representation of an exemplary embodiment of a device of the present invention with a transparent top lid.

The devices and methods of the present invention do not use external electricity sources or electricity or batteries to generate heat. An exemplary embodiment of a device of the present invention is shown in FIG. 1 and FIG. 3. A device of the present invention comprises a casing and a heating element which is a container of a chemical compound, wherein the casing forms an enclosed structure that encases the heating element which is a container of a chemical compound. The heating element which is a container of the chemical compound may be shaped to form a spiral wound heating element. The heating element which is a container of the chemical compound may be made from any material that is capable of withstanding the heat generated by the chemical reaction without being destroyed, and may be capable of wicking a fluid throughout the heating element which is a container, or directing the flow of the fluid in the container. Examples of material include, but are not limited to, textiles, woven or nonwoven materials, cotton, plastics, plastic or natural strings, porous or perforated metal sheet, plastic sheet, porous ceramic materials, or porous fiberglass materials. A heating element which is a container of the chemical compound contains the chemical compound such that a fluid added to the heating element which is a container of the chemical compound reaches the chemical compound at a rate that allows for generation of heat by an exothermic reaction, but does not create steam from the fluid. Thus, a heating element may be made from a textile material, such as woven cotton towel material which is formed into a bag or pouch that contains the chemical compound and that also wicks an added fluid throughout the bag or pouch so that the fluid substantially contacts the contained chemical compound, and optionally at a rate where the chemical reaction does not occur so vigorously or quickly that steam of the fluid is created. Any material that can provide this functionality can be used to form the heating element which is a container of the chemical compound. In an embodiment, a pouch material might be sewn, heat fused, stapled, or otherwise processed to form a pouch with grids that form independent compartments for the chemical compound so as to maintain a substantially equal amount of compound throughout the pouch and prevent the chemical compound's redistribution in the pouch and its collection in only a limited portion of the pouch. Alternatively, the chemical compound might be immobilized in a polymer in form of patches, or sheets. Such polymers may be water soluble.

A heating element which is a container of the chemical compound may be rolled to form a spiral wound heating element. For example, where the heating element which is a container of the chemical compound is a rectangular pouch, as shown in FIG. 3A on the right, the pouch may be rolled to form a spiral wound heating element, made by starting at one of the shorter ends, wherein the pouch is rolled in the direction of the other short end. Optionally, metal strips may be placed lengthwise parallel to the shorter ends and perpendicular to the longer ends so that as the pouch is rolled, the metal strips are incorporated into the rolled pouch and one or more of the metal strips may protrude past the ends of the rolled pouch. In an embodiment, the metal strips may help conduct the heat of the chemical reaction. Alternatively, the container of the chemical compound may be made from a material wherein metal strips or other heat conducting material is incorporated in the material and thus does not need to be added as a separate element in the making of the spiral wound heating element. A rolled pouch comprising the chemical compound is a spiral wound heating element.

One or more spiral wound heating elements may be placed within a casing. An exemplary embodiment of a device of the present invention is shown in FIG. 1, wherein a casing for holding three spiral wound heating elements is shown. There is an extended surface area of an external shell or casing of the thermal-based pest control device of the present invention for enhanced heat transfer. The external shell or casing of the thermal-based pest control device may be made from metal, plastic, or rubber. The shell or casing may be somewhat elastic so as to physically expand and accommodate the expansion of the chemical reaction during its operation. A device of the present invention may have one or more integrated spiral wound heating elements contained within a casing. One or more of the elements are used depending on the size of the container to be heated, referred to herein as a heated body, wherein the heated body may be a container, suitcase or a piece of luggage. One or more spiral wound heating elements may be made of a material which encases the chemical reagent within the spiral wound heating element or the chemical compound/reagent may be incorporated in the material of a spiral wound heating element. For example, a chemical compound or reagent used within the spiral wound heating element or incorporated in the material forming the spiral wound heating element is calcium oxide. The material of a spiral wound heating element may be hydrophilic and enhance water transport to the reagent which may increase the reagent reaction in the chemical reaction between the chemical compound and the fluid added, for example water. The spiral wound element may be coated with a water soluble membrane that slows the movement of the fluid, such as water, and slows the initial heating response of the device. This delay in initial heat response allows a user more time to place the device in a suitcase or closed body after adding water to the device. Alternatively the chemical compound might be mixed with water absorbing polymer which forms hydrogel and slows the heat generating reaction by reducing the speed of water supplied to the chemical compound. An example of such polymer is sodium polyacrylate in the form of powder or granules.

As shown in FIG. 1, there is at least one resealable inlet or port through the casing for adding water at the water filling input (as marked on the figure). This at least one resealable inlet, as shown, has a cap for closing the resealable inlet. It is anticipated that the devices disclosed herein are disposable, in that each device would be used once. The chemical compound could be treated to restore activity or be reacted one or more times to provide other exothermic reactions, so the present invention also contemplates more than one use of a device.

A casing may be a hard material, or may be a flexible material that is capable of containing a liquid, withstanding the heat from the exothermic reaction, transmitting heat from the exothermic reaction, and optionally, having enough flexibility to expand to encompass an added fluid or optionally, any steam produced in the exothermic reaction. For example, as shown in FIG. 1, a shaped casing may be made from a material that has enough rigidity to maintain a desired shape. As shown in FIG. 1, a casing may further comprise a degassing port, which may or may not have a one-way or two-way valve for release of pressure and/or steam from within the casing.

For example, as shown in FIG. 3, a casing may be made of a flexible material that can be laminated or fused to form a bag having an open end for inserting the heating element which is a container of the chemical compound. The open end of the casing is then closed by laminating, fusing, sealing with tape, or clips, or other methods known for sealing a bag closed. In making such a device, a heating element may be made from a textile material that is formed into a rectangular pouch. The pouch is open on one end, and a sufficient amount of the chemical compound, for example, calcium oxide, is provided into the pouch. The open end of the pouch is then sealed, forming the heating element which is a container of the chemical compound. The heating element which is a container of the chemical compound is then placed within the casing. If the casing is a flexible material such as shown in FIG. 3, a bag is formed from the material that is slightly larger than the heating element which is a container of the chemical compound, leaving an open end to allow for the heating element which is a container of the chemical compound to be inserted into the casing. The open end of the casing is sealed. A fluid, such as water, is introduced into the casing through at least one port, optionally having a resealable aspect, such as a cap, a snap lid, a screw top, a plug, or other known openable/closable components for resealable openings. The opened port is then closed and the exothermic reaction occurs. In an aspect, the material for the casing is a multilayer aluminum core material that is commercially available from Targray Technologies International, Montreal, Canada. In an aspect, the material for the casing is Mylar film. In an aspect, the material may be a plastic. Devices of the present invention may comprise a casing that is a material that is impermeable to water, moisture or air. Additionally a casing may be made from a material that is resistive, conducts heat easily and that may be capable of dissipating heat from an inner surface to an outer surface. In an aspect, the material of which a casing is made is easily manufactured into a casing, for example into a bag or container that can enclose at least one heating element which is a container of the chemical compound.

A chemical compound of the present invention may comprise a chemical compound that undergoes an exothermic reaction to release heat when contacted by a fluid. For example, the chemical compound is calcium oxide. An exothermic reaction is created when a fluid, such as $H_2O$, is added to the container of the chemical compound, such as by pouring a sufficient amount of $H_2O$ through a resealable inlet of the casing. As provided, the resealable inlet of the casing is closed, and when the device is used, the resealable inlet of the casing is opened so that fluid can be added from the outside of the casing to the inside of the casing and contact the container of the chemical compound and the chemical compound to initiate the exothermic reaction. After adding the fluid, the one resealable inlet is closed, and the reaction continues to generate heat that is transmitted from the device to the surrounding container, such as luggage.

For example, in a reaction where the chemical compound is calcium oxide, CaO, and theoretically, for one molecule of CaO, 1 molecule of water can react in the equation, $CaO + H_2O \rightarrow Ca(OH)_2$, Mr (CaO)=56.08 g/mol. Mr (H2O)=18.02 g/mol, to provide at least 3.1× more water for complete utilization of the CaO powder. As exemplified in Example 2, only 1.7× water to CaO powder was employed, and the reaction could be made with more water in the same device. The reaction releases heat energy of: 63.7 kJ/mol The temperature generated by a thermal-based pest control device of the present invention may be in a range of from 0° C. to 100° C., or higher. The temperature may be from 35° C. to 70° C., or from about 45° C. or higher. A device of the present invention may provide a temperature that is hot enough to reduce the number of living pests, or kill substantially all of the living bed bugs or life cycle forms of a bed bug, in an enclosed container, such as a suitcase or luggage. The device may remain in the container, such as luggage, until the exothermic reaction is completed, and optionally, is then disposed.

Not shown in all of the figures herein is an external component, such as an outer covering that can be used to cover or enclose the container comprising the thermal-based pest control device of the present invention. In an aspect, an external component is a bag that completely encloses the container with at least one thermal-based pest control device of the present invention contained and reacting therein, so that the heat generated by the device is held in close proximity to the container, and so that the pests within the container cannot escape the container into the surroundings and so that the pests will be exposed to the heat and be killed or at least the number of living pests will be reduced.

A thermal-based pest control device of the present invention may comprise a casing and at least one heating element, such as a spiral wound heating element. The casing may have an opening therethrough for adding fluid, such as water, and it may optionally have an opening for the release of gas. A spiral wound heating element may be wrapped in a metal, plastic, or rubber grid that maintains the wound form of the spiral wound heating element. The grid may enhance heat transfer and may enhance water transfer between the heating element and the shell or casing of the device. The grid has the capacity to provide a spring effect on the heating element and to accommodate expansion of the reagent upon reaction during operation.

In an aspect, a device of the present invention comprises a flexible casing comprising a heating element which is a container of the chemical compound that is not spiral. The casing may have an opening therethrough for adding the fluid, such as water, and it may have an opening for the release of gas. A container of the chemical compound may be wrapped or coated to aid in heat transmission or fluid flow control, such as enhancing water transfer between container of the chemical compound, the chemical compound and/or the interior of the casing.

An aspect of the invention further comprises a component that is an outer covering that covers at least a portion of the shell or casing, or may enclose the entire device and/or may enclose the entire container containing the device. The external component may be made of a low heat conductive material to form an air gap between any items present in the heated body and the shell or casing of the device. The outer covering and the air gap formed between the outer covering and the shell or casing may prevent direct contact between the body to be heated (luggage) and the surrounding environment. An external cover may also be used to enclose a device of the present invention to prevent items within a body to be heated (luggage) and the device present invention which is hot when activated, and may aid in preventing overheating and burning of the items in the heated body in the case of excessive temperature rise of the device.

In a method of the present invention, a thermal-based pest control device is provided comprising a casing enclosing at least one heating element which a container of the chemical compound. A fluid is added to the heating element which is a container of the chemical compound, for example, via a port through the casing, wherein the port has a resealable opening. A chemical reaction occurs between the chemical compound and the fluid, for example, in a chemical reaction comprising calcium oxide and water, producing both calcium hydroxide and heat. Once the chemical reaction is started, the thermal-based pest control device is added to a closed body such as a suitcase or piece of luggage, whereby, when closed, the closed body is heated to a temperature sufficient to kill at least some of the pests contained therein, such as bed bugs, eggs, or larvae present in the closed body. For example, a thermal-based pest control device of the present invention that is 300×90×160 mm (L×W×H) may comprise three spiral wound heating elements with each having a diameter 40 mm in a length of 140 mm. A device having three heating elements may contain 210 grams of calcium oxide and may have a water capacity of 300 mL of water for the creation of the exothermic reactions.

A method may further comprise placing the heated body (e.g., suitcase) into an external component and releasably closing the external component. For example, the external component may be a bag made of a heat retaining material so that the heat of the exothermic reaction occurring in the thermal-based pest control device in the closed container/heated body (e.g., suitcase) is retained around the heated body and not readily released to the atmosphere.

A closed container such as a suitcase or a piece of luggage may get bed bugs from being placed in a dwelling, such as a hotel room or home that has bed bugs in it. A suitcase may have bed bugs enter it while in transit, such as in the overhead bin or under the seat in a plane, train, car or other transport vehicle. A small item, for example, a pillow having bed bugs in it, may be treated with the present invention by placing the item within a closed container and activating a heating device of the present invention to generate heat and kill, or substantially reduce the number of, the living bed bugs present in the small item. The present invention is not intended to kill bed bugs in a dwelling or large indoor space.

In a method, a subject who may have been exposed to bed bugs and whose clothing, within a suitcase, or the suitcase itself, may be carrying pests, such as bed bugs, larvae, eggs or other lifecycle stages of the pest, activates a thermal-based pest control device of the present invention by adding water into the casing containing a heating element which is a container of the chemical compound, such as calcium oxide. The casing is closed so no water is released and one or more of the thermal-based pest control devices is placed within the suitcase. An external component, a bag, is placed around the suitcase comprising the thermal-based pest control device(s) of the present invention. The external component comprising the container/suitcase is stored temporarily to allow the chemical exothermic reaction to proceed and complete, for example, the external component comprising the container/suitcase is placed in the trunk of a car for transit to the next accommodation for the subject. Once the reaction is complete, the container/suitcase is removed from the external component and the pests are killed or the number of living pests is reduced.

The present invention comprises a system, comprising a device comprising a casing and a heating element. A system may comprise a container for holding clothing or other material. A system may comprise an external component, shaped to enclose a container such as a suitcase or luggage.

The present invention comprises a kit, comprising a thermal-based pest control device comprising a casing and a heating element, and instructions for use. Optionally, a kit may comprise a liquid to initiate an exothermic reaction with the chemical compound found within the heating element which is a container of the chemical compound. A kit may comprise a container for holding clothing or other material. A kit may comprise an external component, shaped to enclose a container such as a suitcase or luggage. A kit of the present invention comprises a device comprising a casing and a heating element, instructions for use, and an external component. A kit of the present invention comprises a device comprising a casing and a heating element, instructions for use, a liquid to initiate the exothermic reaction with the chemical compound found within the container of the heating element, and an external component.

The present invention can be understood more readily by reference to the following Examples included therein.

Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

As used in the specification and the appended claims, the singular forms "a," "an" and "the" include plural referents unless the context clearly dictates otherwise. Thus, for example, reference to "a thermal source" includes a combination of two or more such thermal sources, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values described herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data are provided in a number of different formats, and that these data represent endpoints, starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units is also disclosed. For example, if 10 and 15 are disclosed, then 11, 12, 13, and 14 are also disclosed.

"Optional" or "optionally" means that the subsequently described event or circumstance may or may not occur and that the description includes instances where said event or circumstance occurs and instances where it does not.

The word "or" as used herein means any one member of a particular list and also includes any combination of members of that list.

Those skilled in the art will recognize, or be able to ascertain, using no more than routine experimentation, numerous equivalents to the specific embodiments described specifically herein. Such equivalents are intended to be encompassed in the scope of the following claims.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1—Testing of Devices and Suitcases

Figure 2:
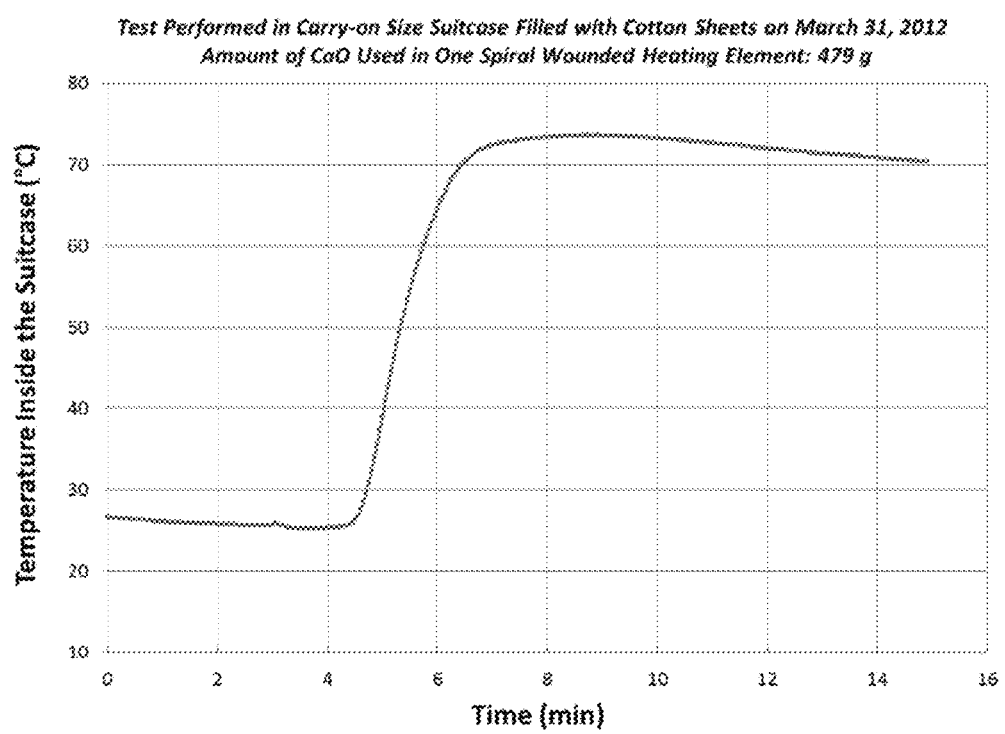
FIG. 2 is a graph showing temperature over time.

Several tests were conducted to demonstrate functionality of an example of the present invention in terms of temperature rise in the heated body. In the example of which results are shown in FIG. 2, one spiral wound heating element made of cotton and filled with 279 g of calcium oxide powder was placed in a metal container which was then filled with water, and the entire device was placed in a suitcase. A computer controlled data-logger was used to monitor temperature in the suitcase using a J type thermocouple. The time dependent temperature results are shown in graphically in FIG. 2. The suitcase contained cotton sheets.

Example 2—Testing of a Device of FIG. 3

The heat generating reaction was run in a device made from a casing material shaped as a pouch made from a multiplayer aluminum core material purchased from Targray, Montreal Canada. The heating element which is a container of the chemical compound was a slightly smaller pouch made of a cotton toweling textile material. As shown in FIG. 3A, on the left is the casing pouch that was made by laminating the sides of the material to form a pouch. On the right, the heating element which is a container of the chemical compound contained calcium oxide powder, and the pouch was formed by sewing the sides of the material together to form a pouch, leaving one side open for adding the calcium oxide powder. Once the powder was added, the open side was stapled shut. The container of the chemical compound was placed within the casing through the open end of the casing pouch. (See FIG. 3B). The casing had a J-type thermocouple attached to the exterior of the casing, which was then wrapped with a cotton cloth and placed flat on a bench in ambient air. (FIG. 3C). Water was added to the closed pouch and the open end of the pouch was sealed with adhesive plastic tape. (See FIG. 3D) The chemical reaction had initiated and continued. After the reaction ended, the casing was examined (See FIG. 3E). The casing was removed and the container of the chemical compound was examined and found to be undamaged. (See FIG. 3F). The thermal endurance of the pouch material as well its seals which were thermally laminated closed were tested and found to be unharmed by the exothermic reaction. The data from the thermocouple was collected.

Figure 4:
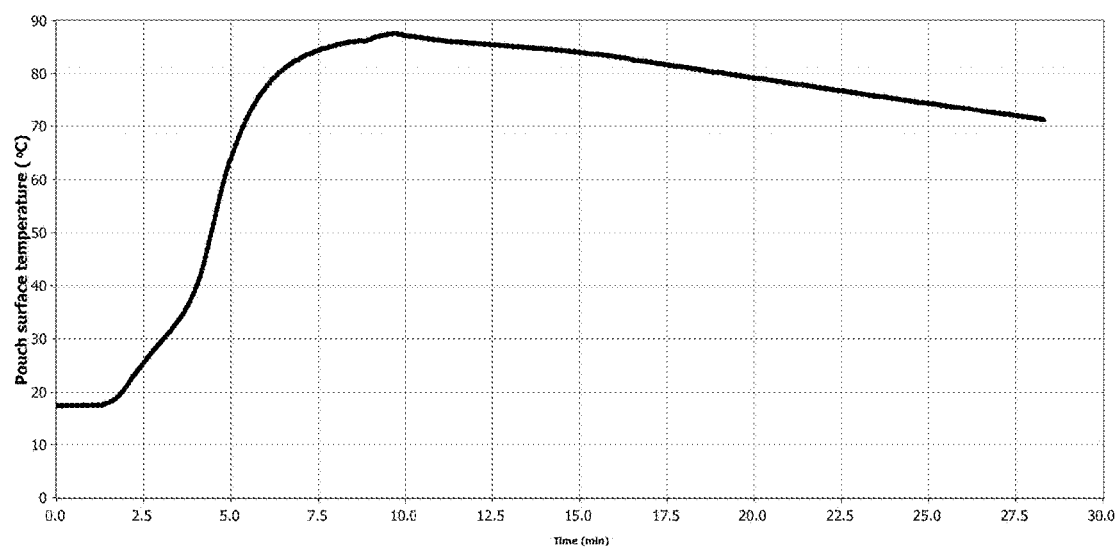
FIG. 4 shows the temperature increase by the device of FIG. 3.

Tested Pouch Sizing Info
Size of the external aluminum core pouch: 210×150 mm including the
Mass of the aluminum core pouch: 10±5 g
Size of the fabric pouch: 100×170 mm including rim
Thickness of the CaO powder loaded fabric pouch: 10-15 mm
Mass of fabric pouch: 15±5 g
Mass of CaO powder loaded in the pouch: 45±5 g
Total dry pouch assembly mass (without water): 70±5 g
Amount of water used: 75 mL
Measured Data Measured temperature on the external pouch wall versus time is shown in FIG. 4. 75 mL of water was introduced into the pouch at 1 min after the data logging start.

Experiment Results

1. No thermal damage to the Al-core pouch or fabric pouch observed.

2. It took 3 minutes to heat the outer walls of the pouch to 50° C., which makes it favorable for the initial handling by a user.
3. The maximal measured temperature of the outer wall was 96.5° C. and temperature over 100° C. was avoided, which is desired to not produce steam.
4. The pouch maintained temperature over 50° C. for 24 min and at that point the experiment was terminated and completed.
5. No leakage of water from the pouch was observed.

After the experiment and the pouch was opened, no obvious and dry unreacted CaO powder was found, also no free water was detected in the pouch, which minimizes the risk of water leak. In this particular reaction, the reaction was starved for water. Stoichiometrically calculated, 3.1× mass of water to CaO powder, could be used, whereas in this experiment, 1.7× weight of water to CaO powder was used.

6. No any expansion or contraction of the casing, nor was steam generation observed during the run.

What is claimed is:

1. A heat delivery device for thermal-based pest control, consisting of:
   i) an air impermeable casing for transmitting heat which comprises at least one resealable inlet for receiving fluid; and
   ii) at least one heating element consisting of particles of calcium oxide positioned within a container for containing the particles, wherein the container is capable of wicking a fluid throughout the heating element, and wherein the at least one heating element is completely enclosed by the casing so that when the calcium oxide reacts with a fluid in an exothermic reaction that generates heat, only the heat is transmitted through the casing.

2. The device of claim 1, wherein the container is made from a woven wicking material and is shaped as a bag or pouch.

3. The device of claim 1, wherein the at least one resealable inlet comprises one resealable inlet.

4. The device of claim 1, wherein the casing is made from a material selected from metal, plastic, or rubber.

5. A method for killing or reducing the number of live insect pests in a container article, comprising:
   a) placing within a container article suspected of having insect pests a heat delivery device for thermal-based pest control, consisting of
   i) an air impermeable casing for transmitting heat which comprises at least one resealable inlet for receiving fluid; and
   ii) at least one heating element consisting of particles of calcium oxide positioned within a container for containing the particles, wherein the container for containing the particles is capable of wicking a fluid throughout the heating element, and wherein the at least one heating element is completely enclosed by the casing so that when the calcium oxide reacts with a fluid in an exothermic reaction that generates heat, only the heat is transmitted through the casing;
   b) providing a fluid through the at least one resealable inlet to the at least one heating element to initiate an exothermic reaction; and
   c) retaining the heat delivery device within the container article for a time sufficient to kill or reduce the number of living pests within the container article.

6. The method of claim 5, wherein the container for containing the particles is made from a woven wicking material and is shaped as a bag or pouch.

7. The method of claim 5, wherein the fluid is water.

8. The method of claim 5, wherein the casing is made from a material selected from metal, plastic, or rubber.

9. A kit comprising:
   a) a heat delivery device for thermal-based pest control, consisting of
   i) an air impermeable casing for transmitting heat which comprises at least one resealable inlet for receiving fluid; and
   ii) at least one heating element consisting of particles of calcium oxide positioned within a container for containing the particles, wherein the container is capable of wicking a fluid throughout the heating element, and wherein the at least one heating element is completely enclosed by the casing so that when the calcium oxide reacts with a fluid in an exothermic reaction that generates heat, only the heat is transmitted through the casing;
   and
   b) instructions for use of the device.

10. The kit of claim 9, wherein the container is made from a woven wicking material and is shaped as a bag or pouch.

11. The device of claim 9, wherein the fluid is water.

12. The kit of claim 9, wherein the casing is made from a material selected from metal, plastic, or rubber.

13. The kit of claim 9, further comprising a fluid.

14. The kit of claim 13, wherein the fluid is water.

* * * * *